US011625275B2

(12) United States Patent
Zmudzinski et al.

(10) Patent No.: US 11,625,275 B2
(45) Date of Patent: *Apr. 11, 2023

(54) TECHNOLOGIES FOR CONTROLLING MEMORY ACCESS TRANSACTIONS RECEIVED FROM ONE OR MORE I/O DEVICES

(71) Applicant: Intel Corporation, Santa Clara, CA (US)

(72) Inventors: Krystof Zmudzinski, Forest Grove, OR (US); Siddhartha Chhabra, Portland, OR (US); Reshma Lal, Hillsboro, OR (US); Alpa Narendra Trivedi, Portland, OR (US); Luis S. Kida, Beaverton, OR (US); Pradeep M. Pappachan, Tualatin, OR (US); Abhishek Basak, Bothell, WA (US); Anna Trikalinou, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/109,742

(22) Filed: Dec. 2, 2020

(65) Prior Publication Data
US 2021/0117576 A1    Apr. 22, 2021

Related U.S. Application Data (63) Continuation of application No. 16/369,295, filed on Mar. 29, 2019, now Pat. No. 10,878,134.

(51) Int. Cl.
*G06F 9/445* (2018.01)
*G06F 9/50* (2006.01)
(Continued)

(52) U.S. Cl.
CPC ........ *G06F 9/5016* (2013.01); *G06F 9/45537* (2013.01); *G06F 9/45545* (2013.01);
(Continued)

(58) Field of Classification Search
CPC ............ G06F 9/45558; G06F 9/45545; G06F 2212/7201; G06F 2212/1052; G06F 21/53;
(Continued)

(56) References Cited

U.S. PATENT DOCUMENTS

| 8,533,777 | B2 | 9/2013 | Fish | |
|---|---|---|---|---|
| 2012/0296998 | A1* | 11/2012 | Pope | ..................... H04L 69/162 709/206 |

(Continued)

OTHER PUBLICATIONS

Parker et al, GB_2539428A, "Data Processing Apparatus and Method With Ownership Table", Dec. 21, 2016, 59 pgs <GB_2539428.pdf>.*

(Continued)

*Primary Examiner* — Tuan A Vu
(74) *Attorney, Agent, or Firm* — Jaffery Watson Mendonsa & Hamilton LLP (57) ABSTRACT

Technologies for secure I/O include a compute device, which further includes a processor, a memory, a trusted execution environment (TEE), one or more input/output (I/O) devices, and an I/O subsystem. The I/O subsystem includes a device memory access table (DMAT) programmed by the TEE to establish bindings between the TEE and one or more I/O devices that the TEE trusts and a memory ownership table (MOT) programmed by the TEE when a memory page is allocated to the TEE.

12 Claims, 6 Drawing Sheets

(51) Int. Cl.
*G06F 9/455* (2018.01)
*G06F 21/62* (2013.01)
*G06F 12/1009* (2016.01)
*G06F 9/46* (2006.01)
*G06F 13/28* (2006.01)
*G06F 21/85* (2013.01)
*G06F 21/78* (2013.01)
*G06F 21/53* (2013.01)
*G06F 21/57* (2013.01)
*H04L 9/32* (2006.01)
*H04W 12/30* (2021.01)
*H04W 12/48* (2021.01)
*H04L 69/16* (2022.01)

(52) U.S. Cl.
CPC .......... *G06F 9/45558* (2013.01); *G06F 9/466* (2013.01); *G06F 12/1009* (2013.01); *G06F 13/28* (2013.01); *G06F 21/53* (2013.01); *G06F 21/57* (2013.01); *G06F 21/62* (2013.01); *G06F 21/78* (2013.01); *G06F 21/85* (2013.01); *H04L 9/3234* (2013.01); *H04L 9/3263* (2013.01); *G06F 2009/45583* (2013.01); *G06F 2212/1052* (2013.01); *G06F 2212/7201* (2013.01); *H04L 9/3242* (2013.01); *H04L 69/162* (2013.01); *H04L 2209/127* (2013.01); *H04W 12/30* (2021.01); *H04W 12/48* (2021.01)

(58) Field of Classification Search
CPC ........... G06F 2009/45583; G06F 21/57; G06F 21/82; G06F 21/85; G06F 9/45537; G06F 9/466; G06F 9/5016; G06F 12/1009; G06F 13/28; H04L 2209/127; H04L 9/3234; H04L 69/162; H04L 9/3263; H04L 9/3242; H04W 12/002; H04W 12/00409
See application file for complete search history.

(56) References Cited

U.S. PATENT DOCUMENTS

| | | |
|---|---|---|
| 2016/0364341 A1 | 12/2016 | Banginwar |
| 2017/0026181 A1 | 1/2017 | Chhabra |
| 2019/0108343 A1 | 4/2019 | Brandwine |
| 2020/0004993 A1 | 1/2020 | Volos |

OTHER PUBLICATIONS

Seed and Ardalan, "The Case for a Virtualization-Based Trusted Execution Environment in Mobile Devices", APSys'18, Aug. 2018, Republic of Korea, Copyright 2018, 8 pages.

* cited by examiner

TECHNOLOGIES FOR CONTROLLING MEMORY ACCESS TRANSACTIONS RECEIVED FROM ONE OR MORE I/O DEVICES

CLAIM TO PRIORITY

This Application is a continuation of and claims the benefit of and priority to U.S. application Ser. No. 16/369,295, entitled TECHNOLOGIES FOR CONTROLLING MEMORY ACCESS TRANSACTIONS RECEIVED FROM ONE OR MORE I/O DEVICES, by Krystof Zmudzinski, et al., filed Mar. 29, 2019, the entire contents of which are incorporated herein by reference.

BACKGROUND

Trust domains provide isolation for virtual machines without including a virtual machine monitor (VMM) in a trusted code base (TCB) of the trust domain. Memory is protected using multi-key total memory encryption (MKTME). Each trust domain has its own Key ID used by MKTME to protect memory contents from other trust domains and the VMM. Hardware in a system-on-a-chip (SoC) enforces the protection. Generally, trust domain systems do not allow I/O devices to access trust domain-protected memory.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
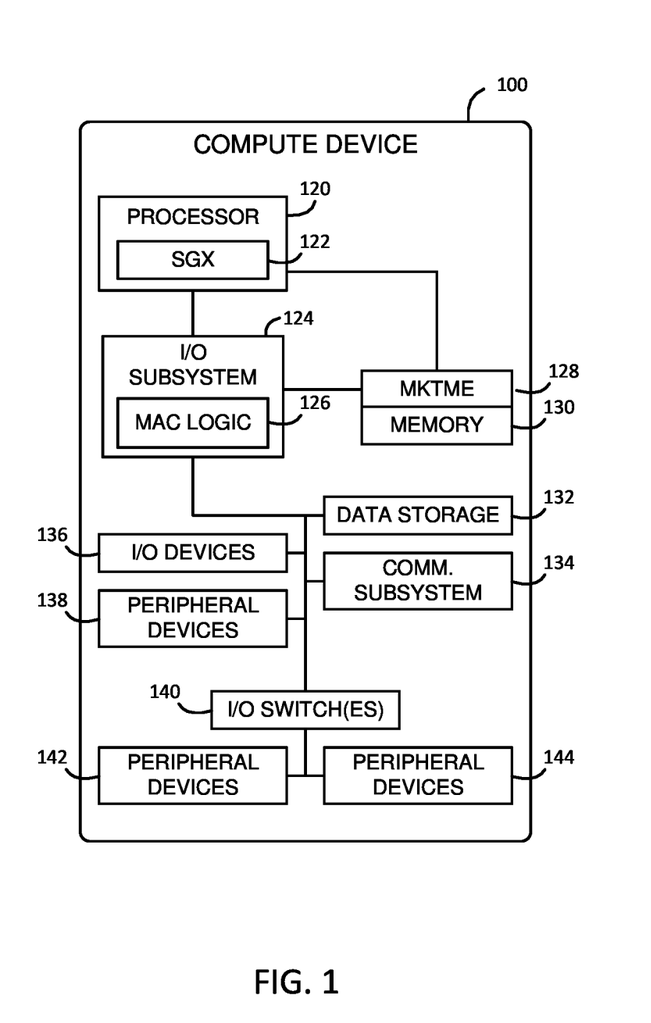
FIG. 1 is a simplified block diagram of at least one embodiment of a compute device having an I/O subsystem for managing direct memory access (DMA) transactions between one or more I/O devices and a trust domain.

Referring now to FIG. 1, a compute device 100 for secure I/O with an I/O device includes a processor 120 and one or more I/O devices 136. In use, as described further below, the compute device 100 includes a virtual machine monitor (VMM) and one or more trusted execution environments (TEE). The VMM and the TEE do not mutually trust each other (e.g., the VMM is not included in the trusted code base (TCB) of the TEE). Additionally, the TEEs do not mutually trust each other. The compute device 100 further includes a trusted agent that is trusted by both the VMM and the TEE. In order to perform a secure I/O with the TEE, the TEE may authenticate an I/O device and determine a reliable device ID for the I/O device. The TEE may program the trusted agent (e.g., the IOMMU, root complex, or the device itself) with a binding between the TEE and the device ID and memory access permissions for a TEE memory. The trusted agent verifies the identity of I/O devices capable of trusted I/O (TIO devices), provisions secrets to the TIO devices, locks, unlocks, and configures the TIO devices, and provides attestation information for the TIO device and the trusted agent to the TEE. In the illustrative embodiment, the trusted agent is embodied as an I/O subsystem 124. When the I/O device generates direct memory access (DMA) transactions to access the TEE memory, the trusted agent may enforce the binding between the TEE and the device ID as well as the memory access permissions. If the transaction is allowed, the TEE's memory is accessed securely using multi-key total memory encryption (MKTME) support. It should be appreciated that a similar technique may be applied to other types of data transactions (e.g., memory-mapped I/O (MMIO) or cache access transactions) generated by the I/O device.

To do so, each TEE programs a device memory access table (DMAT) in the trusted agent to establish bindings between the TEE and one or more I/O devices 136 that the TEE trusts. Accordingly, each entry of the DMAT includes a device ID that uniquely identifies an I/O device 136 trusted by the TEE, a TEE ID (also referred to as a device owner) that uniquely identifies the TEE, and the encryption key ID used to encrypt TEE's physical memory by multi-key total memory encryption (MKTME) to protect memory contents from other TEEs and the VMM. It should be appreciated that the same encryption key ID is assigned by the TEE to one or more I/O devices 136 that it trusts, and the I/O devices 136 use the assigned encryption key ID to encrypt a packet that is to be transmitted to the TEE. When the trusted agent receives a request to access a protected region of a TEE's memory from an I/O device, the trusted agent may verify the identity of the I/O device by accessing the DMAT whether the key ID of an encryption key that was indicated in the request is the same as the key ID that has been assigned to the I/O device by the TEE. However, not all I/O devices have attestation capability, therefore, some I/O devices may not be found in the DMAT. It should be appreciated that the DMAT is not modifiable by the VMM.

Once the trusted agent verifies the identity of the I/O device 136, the trusted agent may further perform security checks to ensure that only trusted I/O devices are allowed to access specific regions of the TEE's private memory set aside for I/O by the TEE. To do so, the trusted agent may also access a memory ownership table (MOT), which describes attributes of a physical frame of the memory 130. Each entry of the MOT is created when a memory page is allocated to the TEE by the VMM and is verified by the TEE. The memory page may be indicated as private, shared, or semi-private (i.e., specific region of the TEE's private memory set aside for I/O by the TEE). For example, the MOT may include a TEE ID of an owner of the memory page, a type of the memory page (e.g., private, shared, or semi-private), and a guest physical address to host physical address mapping. In other words, the MOT stores ownership information of all pages implemented in the platform in an array indexed by a physical address of the page. It should be appreciate that, unlike memory page tables that include a guest physical address (GPA) to host physical address (HPA) mapping and are modifiable by the VMM, the MOT cannot be modified by the VMM. Therefore, memory accesses from I/O devices are checked against the MOT entries to ensure that only trusted I/O devices are allowed to access specific regions of the TEE's private memory that has been set aside for I/O.

If the transaction passes the security checks, the transaction is forwarded to the memory via MKTME. Thus, the compute device 100 allows trusted I/O between a TIO device and a TEE by providing secure configuration and management of trusted I/O devices. The trusted agent operates under the overall control and management of the VMM while still providing assurances to the TEE that the TIO device is configured correctly and will operate as configured during trusted I/O. The compute device 100 does not require that the VMM be within the TCB of the TEE and is thus suitable for datacenter use or other multi-tenant systems.

In some embodiments, the TEE may have its own one or more extended page tables (EPT) and an EPT pointer, which indicates which EPT is being used. The EPT can be only modified with particular CPU instructions. Once the EPT is set to be secured, the EPT cannot be modified by the CPU (e.g., by the VMM). In such embodiments, the DMAT may include a requestor ID, a process address space identifier (PASID), an encryption key ID, a secure EPT pointer, and a guest page table pointer. The requestor ID uniquely identifies a device (e.g., PCI device), and the requestor ID and PASID is used as a lookup key in the DMAT. Additionally, the encryption key ID identifies a key used to encrypt memory and is indicated as the upper bits of the memory addresses, and the guest page table pointer points to an internal guest page tables for guest virtual address (GVA) to guest physical address (GPA) translation.

The compute device 100 may be embodied as any type of device capable of performing the functions described herein. For example, the compute device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative compute device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment (TEE) known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the compute device 100 such as operating systems, applications, programs, libraries, and drivers. As shown, the memory 130 is coupled to the processor 120 and/or the I/O subsystem 124 via a multi-key total memory encryption engine (MKTME) 128, which may be included in or otherwise coupled to a memory controller, integrated memory controller hub, or other memory interface. The MKTME 128 allows the compute device 100 to transparently encrypt the contents of the memory 130. The MKTME 128 maintains a table or other internal, protected structure with multiple encryption keys, which are used to encrypt and decrypt data as it is stored to and read from the memory 130, respectively. The encryption keys are illustratively 128-bit AES XTS keys although may be embodied as any symmetric, asymmetric, or other encryption key. The encryption key may be selected by the MKTME 128 on a per-page basis, for example based on a key identifier included in one or more otherwise unused upper bits of the physical memory page address for a particular memory access. In those embodiments, an operating system, virtual memory monitor, or other supervisory component of the compute device 100 may control access to particular memory pages by configuring one or more page tables and/or extended page tables with the appropriate key identifiers. MKTME keys may be generated by the MKTME 128, in which case they are not disclosed outside of the SoC, or may be supplied by software. In some embodiments, the MKTME 128 may include support for Intel Trusted Domain Extensions (TDX). With TDX, the MKTME 128 may accept an external "domain" key, also called a "user" or "tenant" key. The MKTME 128 may also use a default key that is self-generated to protect memory used by MKTME and Intel SGX as well as Intel TDX. Although illustrated as coupled between the memory 130 and the processor 120 and I/O subsystem 124, it should be understood that in some embodiments, the MKTME 128 may be included in the processor 120, in the I/O subsystem 124, or other component of the compute device 100.

As shown, the processor 120 is communicatively coupled to the I/O subsystem 124, which may be embodied as circuitry and/or components to facilitate input/output operations with the processor 120, the memory 130, and other components of the compute device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. As shown, the memory 130 may be directly coupled to the processor 120, for example via an integrated memory controller hub. In some embodiments, the memory 130 may be directly coupled to the processor 110, for example via an integrated memory controller hub or a data port. The I/O subsystem 120 may further include a sideband network, secure fabric, or other secure routing support. The secure routing support may include hardware support to ensure I/O data cannot be misrouted in the I/O subsystem 120 under the influence of rogue software. Additionally, in some embodiments, the I/O subsystem 124 may form a portion of a system-on-a-chip (SoC) and be incorporated, along with the processor 120, the memory 130, the accelerator 134, and/or other components of the compute device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 further includes a memory access control (MAC) logic 126. The MAC logic 126 may be embodied as any hardware controller(s), component(s), or other circuitry capable of performing the functions described herein. In particular, the MAC logic 126 may manage and check I/O transactions as described further below. Alternatively, in some embodiments, the MAC logic may be incorporated along the I/O path from the I/O device to a single integrated circuit chip.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The compute device 100 may also include a communications subsystem 134, which may be embodied as any communication circuit, device, or collection thereof, capable of enabling communications between the compute device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The I/O device 136 may be embodied as an accelerator and/or or other I/O device of the compute device 100. For example, in some embodiments, the accelerator may be embodied as a field-programmable gate array (FPGA), an application-specific integrated circuit (ASIC), a graphics processor unit (GPU), a coprocessor, or other digital logic device capable of performing accelerated functions (e.g., accelerated application functions, accelerated network functions, or other accelerated functions).

As shown, the compute device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, endpoints, interface devices, and/or peripheral devices. As shown, one or more of the peripheral devices 136 may be coupled to the I/O subsystem 124 via corresponding I/O switches 140. The I/O switches 140 may be embodied as PCI Express (PCIe) switches, PCIe bridges, and/or other switching or routing components of the computing device 100. Thus, the computing device 100 may include a hierarchical system of connected I/O devices, switches, buses, links, and/or other I/O components.

The compute device 100 also includes the communication subsystem 134, which may be embodied as any communication circuit, device, or collection thereof, capable of enabling communications between the compute device 100 and other remote devices over a computer network (not shown). The communication subsystem 134 may be embodied as any network interface card, network adapter, network controller, host fabric interface, network coprocessor, or other component that connects the compute device 100 to a computer network. The communication subsystem 134 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 134 may form a portion of an SoC and be incorporated along with the processor 120, the memory 130, the I/O subsystem 124, and/or other components of the compute device 100 on a single integrated circuit chip.

Figure 2:
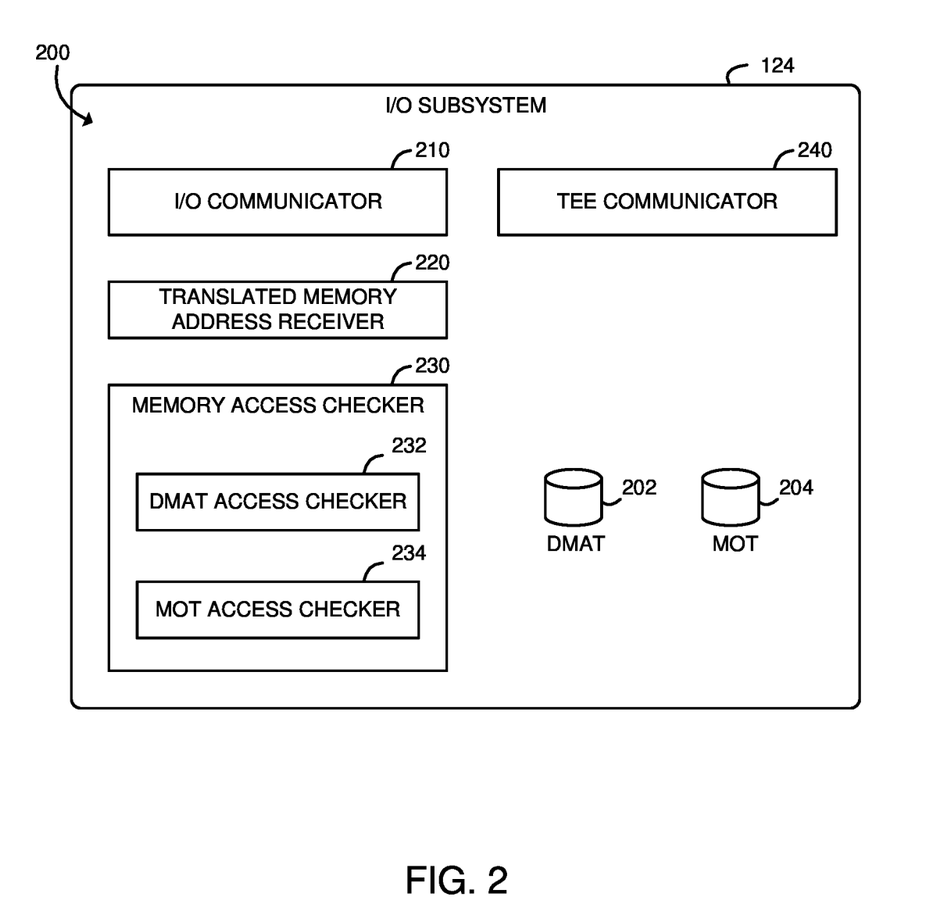
FIG. 2 is a simplified block diagram of at least one embodiment of an environment of the I/O subsystem of FIG. 1.

Referring now to FIG. 2, in an illustrative embodiment, the I/O subsystem 124 of the compute device 100 establishes an environment 200 during operation. The illustrative environment 200 includes an I/O communicator 210, a translated memory address receiver 220, a memory access checker 230, and a TEE communicator 240. The memory access checker 230 further includes a DMAT access checker 232 and a MOT access checker 234. The various components of the environment 200 may be embodied as hardware, firmware, software, or a combination thereof. As such, in some embodiments, one or more of the components of the environment 200 may be embodied as circuitry or collection of electrical devices (e.g., I/O communicator circuitry 210, translated memory address receiver circuitry 220, memory access checker circuitry 230, DMAT access checker circuitry 232, MOT access checker circuitry 234, and/or TEE communicator circuitry 240). It should be appreciated that, in such embodiments, one or more of the I/O communicator circuitry 210, the translated memory address receiver circuitry 220, the memory access checker circuitry 230, the DMAT access checker circuitry 232, the MOT access checker circuitry 234, and the TEE communicator circuitry 240 may form a portion of I/O subsystem 124. Additionally, in some embodiments, one or more of the illustrative components may form a portion of another component and/or one or more of the illustrative components may be independent of one another.

The I/O communicator 210 is configured to communicate with an I/O device (e.g, an accelerator or other I/O device) to receive a transaction generated by the I/O device that requests to access a memory (e.g., the trust domain memory or the memory outside of the trust domain). As discussed above, the transaction includes a device ID of the I/O device and a memory address. The memory address indicates a guest address (e.g., a guest virtual address (GVA) or a guest physical address (GPA)). The memory address further includes a key ID in the upper bits of the memory address that identifies an encryption key used by MKTME to encrypt (e.g., write) or decrypt (e.g., read) the data of transaction.

The translated memory address receiver 220 is configured to receive a host physical address (HPA) that corresponds to a memory address (e.g., GPA or GVA) indicated in the transaction. It should be appreciated that such translation is performed by the VMM and, therefore, is not trusted. As such, the memory access checker 230 is configured to perform security checks to ensure that only trusted I/O devices are allowed to access specific regions of the TEE's private memory set aside for I/O by the TEE. To do so, as described above, the memory access checker 230 includes the DMAT access checker 232 and the MOT access checker 234.

As discussed above, the DMAT is programmed by one or more TEE in the trusted agent to establish bindings between the TEE and one or more I/O devices 136 that the TEE trusts. Accordingly, each entry of the DMAT includes a device ID that uniquely identifies an I/O device 136 trusted by a TEE, a TEE ID (also referred to as a device owner) that uniquely identifies the TEE, and the encryption key ID used to encrypt TEE's physical memory by multi-key total memory encryption (MKTME) to protect memory contents from other TEEs and the VMM. The DMAT access checker 232 is configured to access the DMAT to search for a device ID that matches the device ID of the I/O device requesting the transaction. In response to determination that the matching device ID is found in DMAT, the DMAT access checker 232 is further configured to obtain a TEE ID of the TEE that trusts the requesting I/O device 136 and the key ID that corresponds to the device ID in the DMAT.

As discussed above, each entry of the MOT is created when a memory page is allocated to the TEE by the VMM and is verified by the TEE. Each entry of the MOT includes a TEE ID of an owner of the memory page, a type of the memory page (e.g., private, shared, or semi-private), and guest physical address (GPA) to host physical address (HPA) mapping, which cannot be modified by the VMM. The MOT access checker 234 is configured to access the MOT to search for a HPA that matches the translated HPA (received by the translated memory address receiver 220) that corresponds to the memory address indicated in the transaction. In response to determination that the matching HPA is found in the MOT, the MOT access checker 234 is further configured to obtain a guest address corresponding to HPA, a TEE ID of an owner of a memory page, and a type of the memory page (e.g., private, shared, or semi-private) from the MOT.

The memory access checker 230 is further configured to perform security checks using information obtained from the DMAT access checker 232 and the MOT access checker 234 to determine whether to allow the transaction. If the memory access checker 230 determines that the transaction passes the security checks, the TEE communicator 240 is configured to communicate with one or more TEE to transmit the transaction. To do so, the TEE communicator 240 may transmit the key ID indicated in the transaction and the HPA that corresponds to the memory address indicated in the transaction to the memory (i.e., the specific regions of the TEE's private memory that has been set aside for I/O).

Referring now to FIGS. 3-6, in use, the I/O subsystem 124 of the compute device 100 may execute a method 300 for managing memory access transactions from an I/O device to establish a secure data transfer between an I/O device and a trust domain. It should be appreciated that, in some embodiments, the operations of the method 300 may be performed by one or more components of the environment 200 of the I/O subsystem 124 of the compute device 100 as shown in FIG. 2. The method 300 begins in block 302, in which the I/O subsystem 124 receives a transaction from an I/O device 136 requesting to access the memory 130. In the illustrative embodiment, the memory access request includes a device identification (ID) and a memory address as indicated in block 304. As discussed above, the device ID is a device-specific identifier that is used to verify the identity of the requesting I/O device and the memory address is a guest physical address (GPA) or a guest virtual address (GVA). The memory address may include an encryption key ID in the upper bits that identifies an encryption key.

Figure 3:
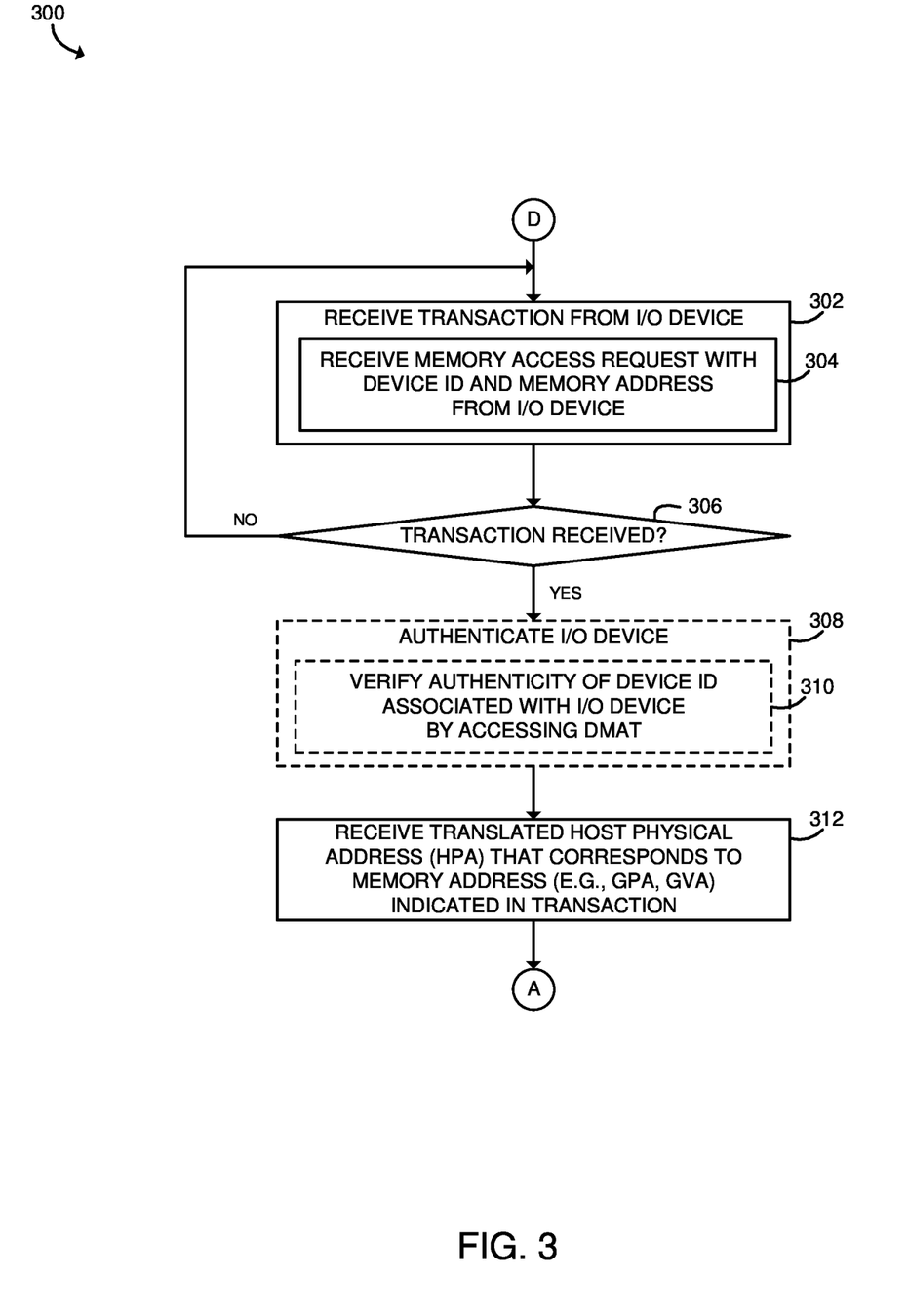
FIGS. 3-6 are a simplified flow diagram of at least one embodiment of a method for managing memory access transactions from an I/O device to establish a secure data transfer between an I/O device and a trust domain that may be executed by the I/O subsystem of the compute device of FIGS. 1 and 2.

In block 306, if the transaction has not been received, the method 300 loops back to block 302 to continue waiting for a transaction from an I/O device 136. If, however, the I/O subsystem 124 determines that a transaction has been received from an I/O device 136, the method 300 advances to block 308, in some embodiments.

In block 308, the I/O subsystem 124 may authenticate the requesting I/O device 136. To do so, in some embodiments, the I/O subsystem 124 may verify authenticity of the device ID associated with the I/O device 136 by accessing the device memory access table (DMAT), as indicated in block 310. As discussed above, each entry of the DMAT includes a device ID that uniquely identifies the I/O device trusted by a TEE, a TEE ID that uniquely identifies the TEE, and the encryption key ID (which indicates an encryption key that was used to encrypt TEE's physical memory) that was assigned to the I/O device. By using the DMAT, the I/O subsystem 124 may determine the key ID that corresponds to the requesting I/O device 136 and verify that the key ID from the DMAT matches the encryption key ID received from the requesting I/O device 136. If so, the requesting I/O device 136 is authenticated. If, however, the encryption key does not match the device ID, the I/O subsystem 124 may determine that the requesting I/O device 136 is trying to force a device ID of another device and does not authenticate the requesting I/O device 136. It should be appreciated that not all I/O devices have attestation capability, therefore, some I/O devices may not be found in DMAT.

In block 312, the I/O subsystem 124 receives a translated host physical address (HPA) that corresponds to the memory address (e.g., GPA or GVA) indicated in the transaction. It should be appreciated that such translation is performed using page tables configured by the VMM and, therefore, may not be trusted. Subsequently, the method 300 advances to block 314 of FIG. 4.

Figure 4:
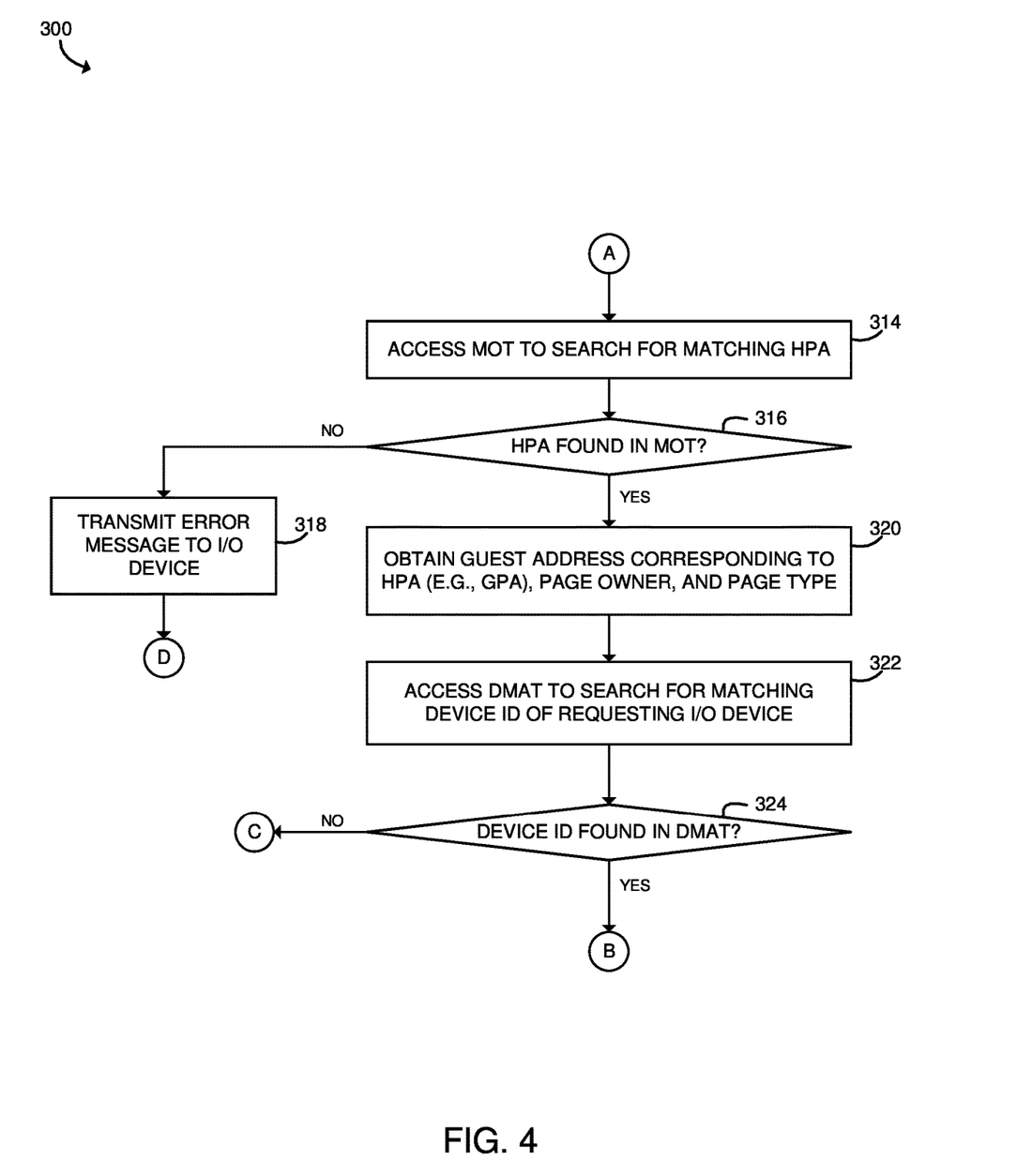

In block 314, the I/O subsystem 124 accesses the memory ownership table (MOT) to search for the matching HPA to confirm the translation of the GVA/GPA. As discussed above, the MOT describes the attributes of a physical frame of the memory 130 and includes information on all pages allocated to all TEEs, such as a TEE ID of an owner of the page (e.g., a memory page allocated to the TEE by the VMM), a type of a page (e.g., private, shared, or I/O), and guest physical to host physical address mapping. Memory accesses from I/O devices are checked against the MOT entries to ensure that only trusted I/O devices are allowed to access specific regions of the TEE's private memory that has been set aside for I/O by the TEE. It should be appreciated that this may validate the translation by the VMM since the translation by VMM is untrusted.

If the HPA is not found in the MOT in block 316, the method 300 advances to block 318 to transmit an error message to the requesting I/O device 136 that the transaction could not been completed because it is requesting to access a page that has not been implemented (e.g., the page does not exist). Subsequently, the method 300 loops back to block 302 to continue waiting for a transaction form an I/O device.

If, however, the I/O subsystem 124 determines that the HPA is found in the MOT, the method 300 advances to block 320. In block 320, the I/O subsystem 124 obtains a guest address (e.g., GPA or GVA) corresponding to HPA, a TEE ID of the owner of the page, and a type of the page.

Subsequently, in block 322, the I/O subsystem 124 accesses the device memory access table (DMAT) to search for the matching device ID. As discussed above, the DMAT is programmed by one or more trusted execution environments (TEE), and each entry of the DMAT binds a TEE to an I/O device that the TEE trusts. Accordingly, each entry of the DMAT includes a device ID that uniquely identifies the I/O device trusted by a TEE, a TEE ID (also referred to as a device owner) that uniquely identifies the TEE, and the encryption key ID used to encrypt TEE's physical memory. As discussed above, the TEE assigns the same encryption key ID to one or more I/O devices that it trusts, and the I/O devices use the assigned encryption key ID to encrypt a packet to be transmitted to the I/O subsystem 124.

Figure 5:
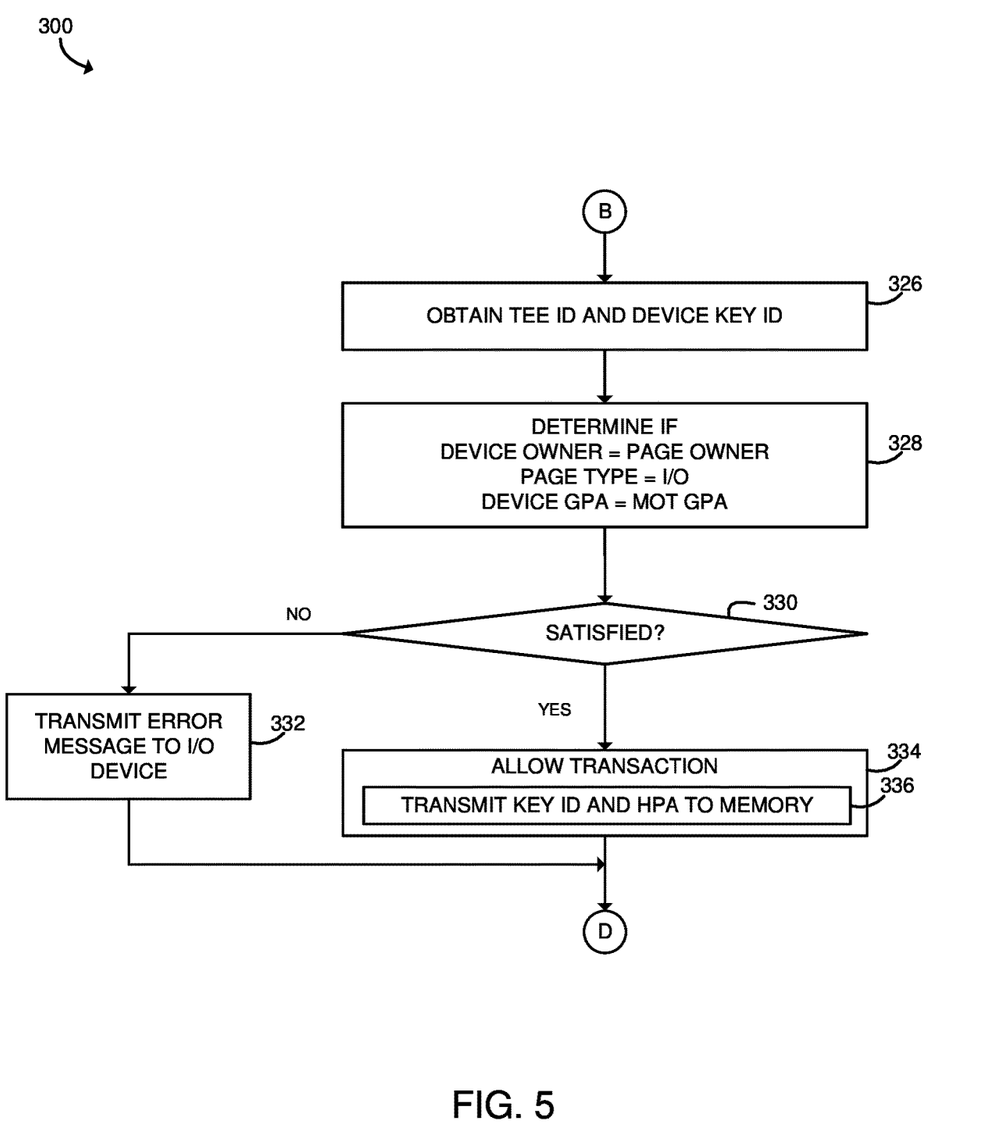

If the device ID is found in the DMAT in block 324, the method 300 advances to block 326 of FIG. 5. If, however, the device ID is not found in the DMAT, the method 300 skips ahead to block 342 of FIG. 6.

In block 326 of FIG. 5, the I/O subsystem 124 obtains the TEE ID and the encryption key ID corresponding to the TEE's memory. Subsequently, in block 328, the I/O subsystem 124 determines whether the device owner obtained from the DMAT is the page owner obtained from the MOT and the page type obtained from the MOT is I/O. Additionally, the I/O subsystem 124 further determines whether the device GPA indicated in the memory access request is the MOT GPA obtained from the MOT. In other words, the I/O subsystem 124 determines whether the encryption key ID (which identifies a key used to encrypt memory) indicated as the upper bits of the device GPA matches the key ID of the TEE.

If the I/O subsystem 124 determines that those conditions are not satisfied in block 330, the method 300 advances to block 332 to transmit an error message to the requesting I/O device 136 that the transaction could not been completed. For example, the trusted I/O device may not access a memory page that is not allocated to a TEE. Subsequently, the method 300 loops back to block 302, shown in FIG. 3, to continue waiting for a transaction from an I/O device 136.

If, however, the I/O subsystem 124 determines that the conditions are not satisfied in block 330, the method 300 advances to block 334 to allow the transaction (i.e., allow the memory access requested by the I/O device by accessing the TEE's private memory set aside for I/O). To do so, the I/O subsystem 124 transmits the encryption key ID and the HPA to the MKTME 128 to access the protected memory 130, as indicated in block 336. In other words, the I/O subsystem 124 allows the trusted I/O device to access the TEE's private memory set aside for I/O with the encryption key ID.

Figure 6:
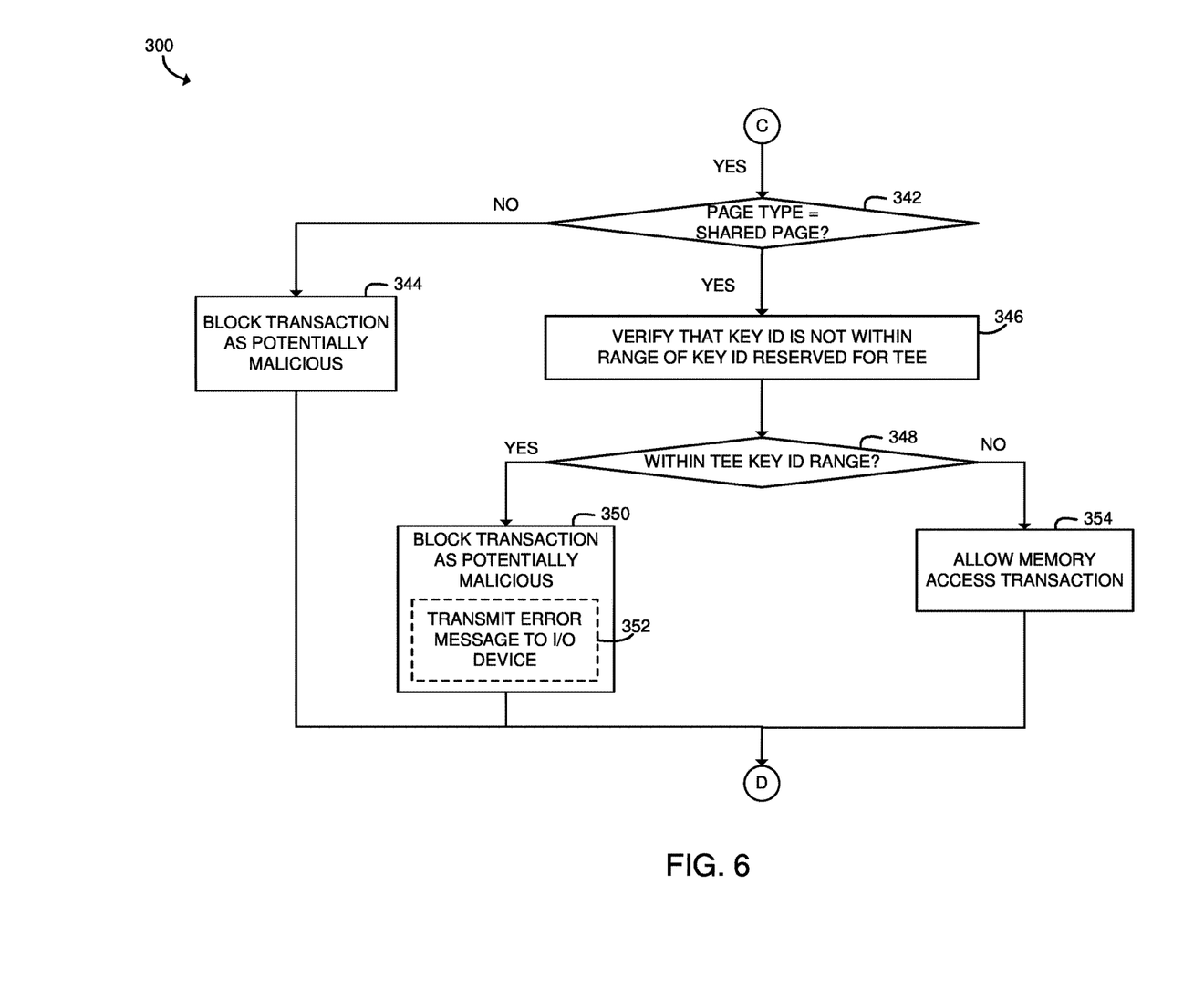

Referring back to block 324, if the device ID was not found in the DMAT (i.e., not trusted by a TEE), the I/O subsystem 124 determines that the requesting I/O device 136 is not bound to any TEE (i.e., an untrusted I/O device), and the method 300 skips ahead to block 342 of FIG. 6. In block 342, the I/O subsystem 124 determines whether the page type obtained the MOT is a shared page. In other words, if the requesting I/O device is an untrusted I/O device 136, the I/O subsystem 124 determines whether the requesting I/O device is requesting to access a shared page of the TEE memory.

If the page type is not shared, the method 300 advances to block 344, and the I/O subsystem 124 blocks the transaction as potentially malicious. Subsequently, the method 300 loops back to block 302, shown in FIG. 3, to continue waiting for a transaction from an I/O device 136.

If, however, the I/O subsystem 124 determines that the page is not a shared page, the I/O subsystem 124 determines that the untrusted I/O device 136 is requesting to access memory outside of the TEE. To ensure that the untrusted I/O device 136 is using a private key ID reserved for a TEE, the method 300 advances to block 346 to verify that the key ID is not within a range of key ID reserved for the TEE. If the I/O subsystem 124 determines that the key ID indicated in the transaction is within the TEE key ID range in block 348, the method 300 advances to block 350. In block 350, the I/O subsystem 124 determines that the untrusted I/O device is requesting to use a key ID that is reserved for a TEE and a trusted I/O device and blocks the transaction as potentially malicious. In some embodiments, the I/O subsystem 124 may further transmit an error message to the requesting I/O device. Subsequently, the method 300 loops back to block 302 to continue waiting for a transaction from an I/O device 136.

If, however, the I/O subsystem 124 determines that the key ID indicated in the transaction is not within the TEE key ID range in block 348, the method 300 advances to block 352. In block 352, the I/O subsystem 124 to allow the memory access transaction to the shared memory. Subsequently, the method 300 loops back to block 302 to continue waiting for a transaction from an I/O device 136.

EXAMPLES

Illustrative examples of the technologies disclosed herein are provided below. An embodiment of the technologies may include any one or more, and any combination of, the examples described below.

Example 1 includes a compute device for secure I/O, the compute device comprising a processor; a memory; a trusted execution environment (TEE); one or more input/output (I/O) devices; and an I/O subsystem including a device memory access table (DMAT) programmed by the TEE to establish bindings between the TEE and one or more I/O devices that the TEE trusts and a memory ownership table (MOT) programmed by the TEE when a memory page is allocated to the TEE.

Example 2 includes the subject matter of Example 1, and wherein each entry of the DMAT includes a device ID that uniquely identifies an I/O device trusted by the TEE, a TEE ID that uniquely identifies the TEE, and a key ID used to encrypt TEE's physical memory.

Example 3 includes the subject matter of any of Examples 1 and 2, and wherein each entry of the MOT includes a TEE ID of an owner of the memory page, a type of the memory page, and a guest physical address to host physical address mapping.

Example 4 includes the subject matter of any of Examples 1-3, and wherein the type of the memory page includes private, shared, or semi-private, wherein the semi-private page is a specific region of the TEE's private memory set aside for I/O by the TEE.

Example 5 includes a compute device of claim 1, wherein the I/O subsystem is configured to receive a transaction from an I/O device of the one or more I/O devices, wherein the transaction includes a device ID associated with the I/O device and a memory address including a key ID; translate the memory address to a host physical address (HPA); access the MOT to determine whether the HPA exists in the MOT; obtain, in response to determination that the HPA exists in the MOT, attributes of a physical frame of the memory, wherein the attributes include a guest address corresponding to the HPA, a page owner, and a page type; access the DMAT to determine whether the device ID exists in the DMAT; obtain, in response to determination that the device ID exists in the DMAT, a TEE ID and a device key ID; and perform a memory access check to determine whether to allow the transaction based on the obtained information from the DMAT and the MOT.

Example 6 includes the subject matter of Example 5, and wherein the transaction is a direct memory access transaction.

Example 7 includes the subject matter of any of Examples 5 and 6, and wherein the I/O subsystem is further to verify authenticity of the device ID associated with the I/O device by accessing the DMAT.

Example 7 includes the subject matter of any of Examples 5 and 6, and wherein the I/O subsystem is further to allow, in response to determination that the HPA exists in the MOT and the device ID exists in the DMAT, the transaction if the device owner is the page owner, the page type is semi-private, and device GPA is the GPA found in the MOT.

Example 8 includes the subject matter of any of Examples 5-7, and wherein the I/O subsystem is further to determine, in response to determination that the device ID was not found in the DMAT, whether the page type is a shared page; and block, in response to determination that the page type is not the shared page, the transaction as potentially malicious.

Example 9 includes the subject matter of any of Examples 5-8, and wherein the I/O subsystem is further to verify, in response to determination that the page type is the shared page, that the key ID is not within a range of TEE key ID reserved for the TEE; and block, in response to determination that the key ID is within the range of TEE key ID, the transaction as potentially malicious; and allow, in response to determination that the key ID is not within the range of TEE key ID, the transaction.

Example 10 includes the subject matter of any of Examples 5-9, and wherein the I/O subsystem is further to block, in response to determination that the HPA does not exist in the MOT, the transaction.

Example 11 includes a method for secure I/O, the method comprising receiving, by a device, a transaction from an I/O device of the one or more I/O devices, wherein the transaction includes a device ID associated with the I/O device and a memory address including a key ID; translating, by the device, the memory address to a host physical address (HPA); accessing, by the device, a memory ownership table (MOT) to determine whether the HPA exists in the MOT; obtaining, in response to determination that the HPA exists in the MOT and by the device, attributes of a physical frame of the memory, wherein the attributes include a guest address corresponding to the HPA, a page owner, and a page type; accessing, by the device, a device memory access table (DMAT) to determine whether the device ID exists in the DMAT; obtaining, in response to determination that the device ID exists in the DMAT and by the device, a trusted execution environment identifier (TEE ID) and a device key ID; performing, by the device, a memory access check to determine whether to allow the transaction based on the obtained information from the DMAT and the MOT.

Example 12 includes the subject matter of Example 11, and wherein the DMAT is programmed by a trusted execution environment (TEE) to establish bindings between the TEE and one or more I/O devices that the TEE trusts, and each entry of the DMAT includes a device ID that uniquely identifies an I/O device trusted by the TEE, a TEE ID that uniquely identifies the TEE, and a key ID used to encrypt TEE's physical memory.

Example 13 includes the subject matter of any of Examples 11 and 12, and wherein a memory ownership table (MOT) is programmed by the TEE when a memory page is allocated to the TEE, and each entry of the MOT includes a TEE ID of an owner of the memory page, a type of the memory page, and guest physical address to host physical address mapping.

Example 14 includes the subject matter of any of Examples 11-13, and wherein the type of the memory page includes private, shared, or semi-private, wherein the semi-private page is a specific region of the TEE's private memory set aside for I/O by the TEE.

Example 15 includes the subject matter of any of Examples 11-14, and wherein the transaction is a direct memory access transaction.

Example 16 includes the subject matter of any of Examples 11-15, and further including verifying, by the device, authenticity of the device ID associated with the I/O device by accessing the DMAT.

Example 17 includes the subject matter of any of Examples 11-16, and further including allowing, in response to determination that the HPA exists in the MOT and the device ID exists in the DMAT and by the device, the transaction if the device owner is the page owner, the page type is semi-private, and device GPA is the GPA found in the MOT.

Example 18 includes the subject matter of any of Examples 11-17, and further including determining, in response to determination that the device ID was not found in the DMAT and by the device, whether the page type is a shared page; and blocking, in response to determination that the page type is not the shared page and by the device, the transaction.

Example 19 includes the subject matter of any of Examples 11-18, and further including verifying, in response to determination that the page type is the shared page and by the device, that the key ID is not within a range of TEE key ID reserved for the TEE; blocking, in response to determination that the key ID is within the range of TEE key ID and by the device, the transaction as potentially malicious; and allowing, in response to determination that the key ID is not within the range of TEE key ID and by the device, the transaction.

Example 20 includes one or more machine-readable storage media comprising a plurality of instructions stored thereon that, in response to being executed, cause a compute device to receive a transaction from an I/O device of the one or more I/O devices, wherein the transaction includes a device ID associated with the I/O device and a memory address including a key ID; translate the memory address to a host physical address (HPA); access a memory ownership table (MOT) to determine whether the HPA exists in the MOT; obtain, in response to determination that the HPA exists in the MOT, attributes of a physical frame of the memory, wherein the attributes include a guest address corresponding to the HPA, a page owner, and a page type; access a device memory access table (DMAT) to determine whether the device ID exists in the DMAT; obtain, in response to determination that the device ID exists in the DMAT, a trusted execution environment identifier (TEE ID) and a device key ID; perform a memory access check to determine whether to allow the transaction based on the obtained information from the DMAT and the MOT.

The invention claimed is:

1. An apparatus comprising:
    a processor coupled to a memory;
    one or more input/output (I/O) devices; and
    an I/O subsystem to access a memory ownership table (MOT) programmed by a trusted execution environment (TEE) to determine whether a host physical address (HPA) exists in the MOT, and allow, in response to the HPA existing in the MOT, processing of a transaction, wherein the transaction includes a direct memory access transaction.

2. The apparatus of claim 1, wherein the transaction comprising a device identifier (ID) associated with an I/O device and a memory address including a key ID, and wherein the I/O subsystem is further to:
    translate the memory address into the HPA;
    obtain, in response to the HPA existing in the MOT, attributes of a physical frame of the memory;
    access a device memory access table (DMAT) to determine whether the device ID exists in the DMAT;
    obtain, in response to the device ID existing in the DMAT, a TEE ID and a device key ID; and
    perform a memory access check to determine whether to allow the transaction based on the information obtained from the MOT and the DMAT.

3. The apparatus of claim 2, wherein the I/O subsystem is further to:
    determine, in response to the device ID not existing in the DMAT, whether a page type includes a shared page, wherein the attributes include information identifying one or more of the page type, a page owner, and a guest address corresponding to the HPA; and
    block, in response to the page type not including the shared page, the transaction from being processed, wherein the block transaction is classified as malicious.

4. The apparatus of claim 1, wherein the I/O subsystem is further to verify authenticity of the device ID associated with the I/O device by accessing the DMAT.

5. A method comprising:
    accessing, by an input/output (I/O) subsystem coupled to a processor, a memory ownership table (MOT) programmed by a trusted execution environment (TEE) to determine whether a host physical address (HPA) exists in the MOT, and allow, in response to the HPA existing in the MOT, processing of a transaction, wherein the transaction includes a direct memory access transaction.

6. The method of claim 5, wherein the transaction comprising a device identifier (ID) associated with an I/O device and a memory address including a key ID, and wherein the method further comprises:
    translating the memory address into the HPA;
    obtaining, in response to the HPA existing in the MOT, attributes of a physical frame of the memory;
    accessing a device memory access table (DMAT) to determine whether the device ID exists in the DMAT;
    obtaining, in response to the device ID existing in the DMAT, a TEE ID and a device key ID; and
    performing a memory access check to determine whether to allow the transaction based on the information obtained from the MOT and the DMAT.

7. The method of claim 6, further comprising:
    determining, in response to the device ID not existing in the DMAT, whether a page type includes a shared page, wherein the attributes include information identifying one or more of the page type, a page owner, and a guest address corresponding to the HPA; and
    blocking, in response to the page type not including the shared page, the transaction from being processed, wherein the block transaction is classified as malicious.

8. The method of claim 5, further comprising verifying authenticity of the device ID associated with the I/O device by accessing the DMAT.

9. At least one computer-readable medium having stored thereon instructions which, when executed, cause a computing device to perform operations comprising:
    accessing, via an input/output (I/O) subsystem of the computing device, a memory ownership table (MOT) programmed by a trusted execution environment (TEE) to determine whether a host physical address (HPA) exists in the MOT, and allow, in response to the HPA existing in the MOT, processing of a transaction, wherein the transaction includes a direct memory access transaction.

10. The computer-readable medium of claim 9, wherein the transaction comprising a device identifier (ID) associated with an I/O device and a memory address including a key ID, and wherein the operations further comprise:
    translating the memory address into the HPA;
    obtaining, in response to the HPA existing in the MOT, attributes of a physical frame of the memory;
    accessing a device memory access table (DMAT) to determine whether the device ID exists in the DMAT;
    obtaining, in response to the device ID existing in the DMAT, a TEE ID and a device key ID; and
    performing a memory access check to determine whether to allow the transaction based on the information obtained from the MOT and the DMAT.

11. The computer-readable medium of claim 10, wherein the operations further comprise:
   determining, in response to the device ID not existing in the DMAT, whether a page type includes a shared page, wherein the attributes include information identifying one or more of the page type, a page owner, and a guest address corresponding to the HPA; and
   blocking, in response to the page type not including the shared page, the transaction from being processed, wherein the block transaction is classified as malicious.

12. The computer-readable medium of claim 9, wherein the operations further comprise verifying authenticity of the device ID associated with the I/O device by accessing the DMAT.

* * * * *